United States Patent
Oda et al.

(10) Patent No.: US 11,865,902 B2
(45) Date of Patent: Jan. 9, 2024

(54) SHEET, DOOR HOLE SEAL, AND METHOD FOR PRODUCING THE SAME

(71) Applicant: NISHIKAWA RUBBER CO., LTD., Hiroshima (JP)

(72) Inventors: Hiromu Oda, Hiroshima (JP); Yoshihiro Kohara, Hiroshima (JP)

(73) Assignee: NISHIKAWA RUBBER CO., LTD., Hiroshima (JP)

( * ) Notice: Subject to any disclaimer, the term of this patent is extended or adjusted under 35 U.S.C. 154(b) by 768 days.

(21) Appl. No.: 16/994,199

(22) Filed: Aug. 14, 2020

(65) Prior Publication Data

US 2021/0070154 A1    Mar. 11, 2021

(30) Foreign Application Priority Data

Sep. 10, 2019 (JP) ................. 2019-164570

(51) Int. Cl.
- *B60R 13/08* (2006.01)
- *B60J 5/04* (2006.01)
- *B60J 10/86* (2016.01)

(52) U.S. Cl.
CPC .............. *B60J 5/0418* (2013.01); *B60J 10/86* (2016.02); *B60R 13/0815* (2013.01); *Y10T 428/15* (2015.01)

(58) Field of Classification Search
None
See application file for complete search history.

(56) References Cited

U.S. PATENT DOCUMENTS

| 2005/0052051 A1 | 3/2005 | Kohara |
| 2006/0091696 A1 | 5/2006 | Kohara |
| 2018/0093621 A1 | 4/2018 | Morimoto et al. |

FOREIGN PATENT DOCUMENTS

| JP | 51-151320 U | 12/1976 | |
| JP | 5-330343 | 12/1993 | |
| JP | 2636596 | 7/1997 | |
| JP | 3890568 | 3/2007 | |
| JP | 2011-173659 | 9/2011 | |
| JP | 2014-94659 | 5/2014 | |
| JP | 2018-58402 | 4/2018 | |
| WO | WO-2019094673 A1 * | 5/2019 | ............ B60J 5/0416 |

OTHER PUBLICATIONS

Office Action for JP 2019-164570, dated May 30, 2023, 2 pages.

* cited by examiner

*Primary Examiner* — Alexander S Thomas
(74) *Attorney, Agent, or Firm* — Casimir Jones, S.C.; Robert A. Goetz

(57) ABSTRACT

The present invention reduces the generation of an unusual sound resulting from vibration of a part of a sheet. A first sheet includes: a peripheral portion which is to surround a service hole of a door inner panel; and a central portion surrounded by the peripheral portion, the first sheet having, along a boundary between the central portion and the peripheral portion, a plurality of first holes and a plurality of second holes each of which differs in size from each of the plurality of first holes.

1 Claim, 5 Drawing Sheets

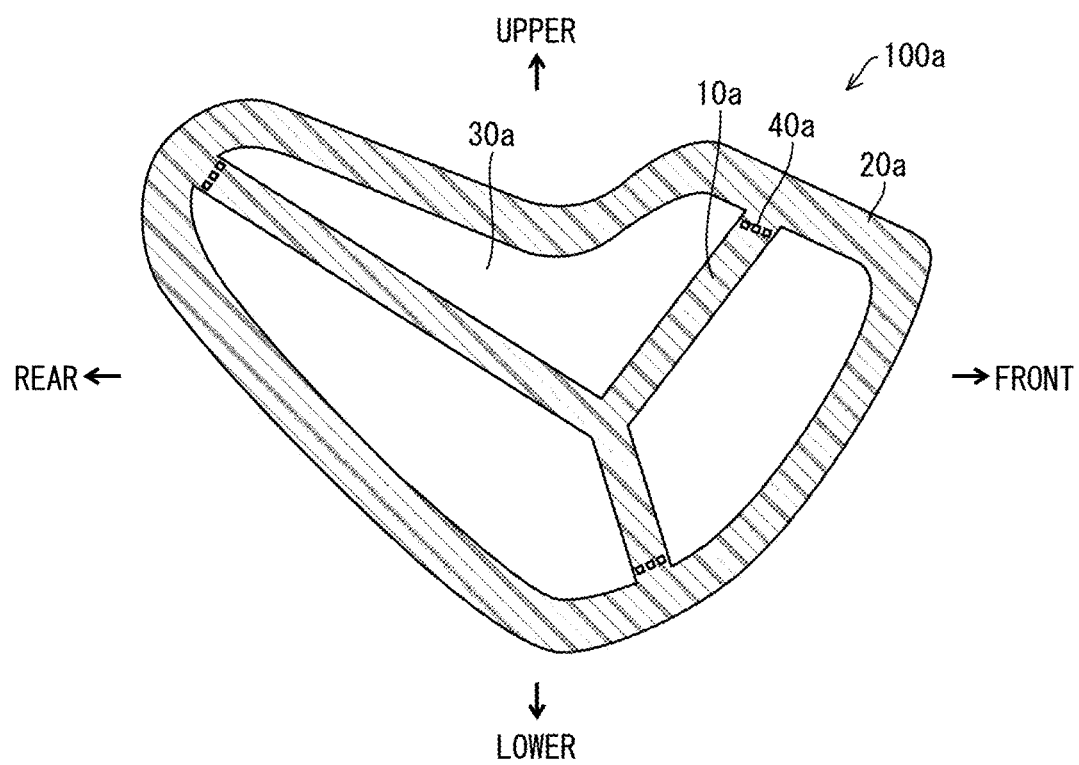

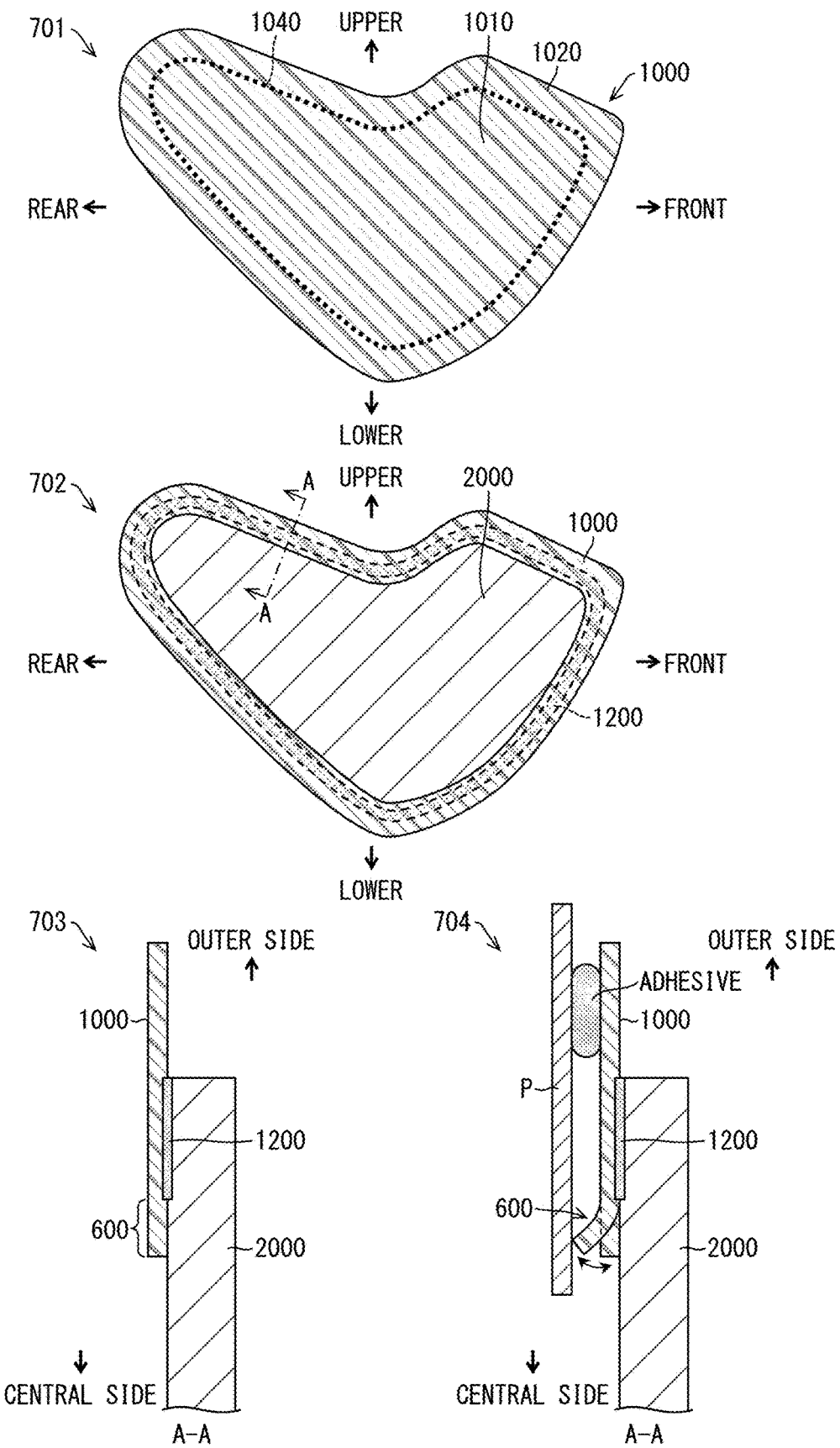

SHEET, DOOR HOLE SEAL, AND METHOD FOR PRODUCING THE SAME

This Nonprovisional application claims priority under 35 U.S.C. § 119 on Patent Application No. 2019-164570 filed in Japan on Sep. 10, 2019, the entire contents of which are hereby incorporated by reference.

TECHNICAL FIELD

The present invention relates to: a sheet configured to constitute a part of a door hole seal to be attached to a door inner panel of a door of a vehicle; the door hole seal including the sheet and a sound insulating material; and a method for producing the door hole seal.

BACKGROUND ART

Generally, a door of a vehicle is constituted mainly by a door outer panel which is positioned on a vehicle-exterior side, a door trim, and a door inner panel provided between the door outer panel and the door trim. Some conventional doors include a door hole seal attached between the door inner panel and the door trim.

In recent years, there are cases in which a foam of an elastomer such as EPDM is used as a door hole seal (see Patent Literature 1). A view indicated by a reference numeral "702" in FIG. 7 is a view schematically illustrating a structure of this type of door hole seal. As illustrated in the view indicated by the reference numeral "702", this type of door hole seal includes a first sheet 1000 and a second sheet 2000. Note that the first sheet 1000 is welded to the second sheet 2000 via a welding part 1200. A view indicated by a reference numeral "701" in FIG. 7 is a view schematically illustrating a structure of the first sheet 1000 before the first sheet 1000 is attached to a door of a vehicle. Before being attached to the door of the vehicle, the first sheet 1000 includes (i) a peripheral portion 1020 which is to surround a service hole of a door inner panel and (ii) a central portion 1010 surrounded by the peripheral portion 1020, and a line of perforation 1040 in an annular shape is provided between the central portion 1010 and the peripheral portion 1020. The second sheet 2000 is mainly made of a foam of an elastomer such as EPDM.

This door hole seal is designed to be cut, at or before attachment of the door hole seal, along the line of perforation 1040 so that the central portion 1010 is removed and the peripheral portion 1020 remains as part of a main body portion of the door. In a state illustrated in the view indicated by the reference numeral "702" in FIG. 7, the central portion 1010 has been removed by cutting the central portion 1010 and the peripheral portion 1020 off from each other along the line of perforation 1040. As such, the line of perforation 1040 does not appear in the view indicated by the reference numeral "702" in FIG. 7. Note that a door hole seal disclosed in Patent Literature 2 is similar in structure to the door hole seal illustrated in the view indicated by the reference numeral "702" in FIG. 7.

CITATION LIST

Patent Literature

[Patent Literature 1]
Japanese Patent No. 3890568
[Patent Literature 2]
Japanese Patent No. 2636596

SUMMARY OF INVENTION

Technical Problem

In FIG. 7, views indicated by reference numerals 703 and 704 are cross-sectional views of the door hole seal, each taken along a line A-A of the view indicated by the reference numeral "702". As illustrated in these cross-sectional views, a portion of the first sheet 1000 which portion is closer to a center of the door hole seal (i.e., closer to a lower side of a drawing sheet of FIG. 7) than the welding part 1200 is an unwelded portion 600. Accordingly, as illustrated in the view indicated by the reference numeral 704 in FIG. 7, vibration of the vehicle and/or vibration of a speaker causes the unwelded portion 600 (a part of the first sheet 1000) of the door hole seal to vibrate and interfere with a door inner panel P. This tends to generate an unusual sound. As described above, the door hole seal disclosed in Patent Literature 2 is similar in structure to the door hole seal illustrated in the view indicated by the reference numeral "702", so that the door hole seal disclosed in Patent Literature 2 has a problem similar to the above-described problem of the door hole seal illustrated in the view indicated by the reference numeral "702".

An aspect of the present invention was made in view of the above problem and has an object of providing a sheet, a door hole seal, and a method for producing the door hole seal each of which enables reducing the generation of an unusual sound resulting from vibration of a part of the sheet.

Solution to Problem

In order to attain the object, a sheet in accordance with an aspect of the present invention is a sheet configured to constitute a part of a door hole seal to be attached to a door inner panel of a door of a vehicle, including: a peripheral portion which is to surround a service hole of the door inner panel; and a central portion surrounded by the peripheral portion, the sheet having, along a boundary between the central portion and the peripheral portion, a plurality of first holes and a plurality of second holes each of which differs in size from each of the plurality of first holes.

In order to attain the object, a door hole seal in accordance with an aspect of the present invention is a door hole seal to be attached to a door inner panel of a door of a vehicle, including: a sheet having an opening which is to surround a service hole provided in the door inner panel; and a sound insulating material welded to the sheet and configured to seal the service hole from a vehicle-interior side, the sheet having an inner circumferential wall which defines the opening and has an uneven shape made up of a plurality of recesses and protrusions in a plan view.

In order to attain the object, a method in accordance with an aspect of the present invention for producing a door hole seal is a method for producing a door hole seal to be attached to a door inner panel of a door of a vehicle, the method including: a hole forming step of forming, in a sheet configured to constitute a part of the door hole seal, a plurality of first holes and a plurality of second holes, each of which differs in size from each of the plurality of first holes, to define (i) a peripheral portion of the sheet which peripheral portion is to surround a service hole of the door inner panel and (ii) a central portion of the sheet which central portion is surrounded by the peripheral portion; a welding step of welding, to the sheet in which the plurality of first holes and the plurality of second holes have been formed, a sound insulating material such that the sound insulating material covers the central portion from a vehicle-interior side; and a removing step of removing the central portion from the sheet to which the sound insulating material has been welded.

Advantageous Effects of Invention

An aspect of the present invention makes it possible to reduce the generation of an unusual sound resulting from vibration of a part of a sheet.

Figure 3:
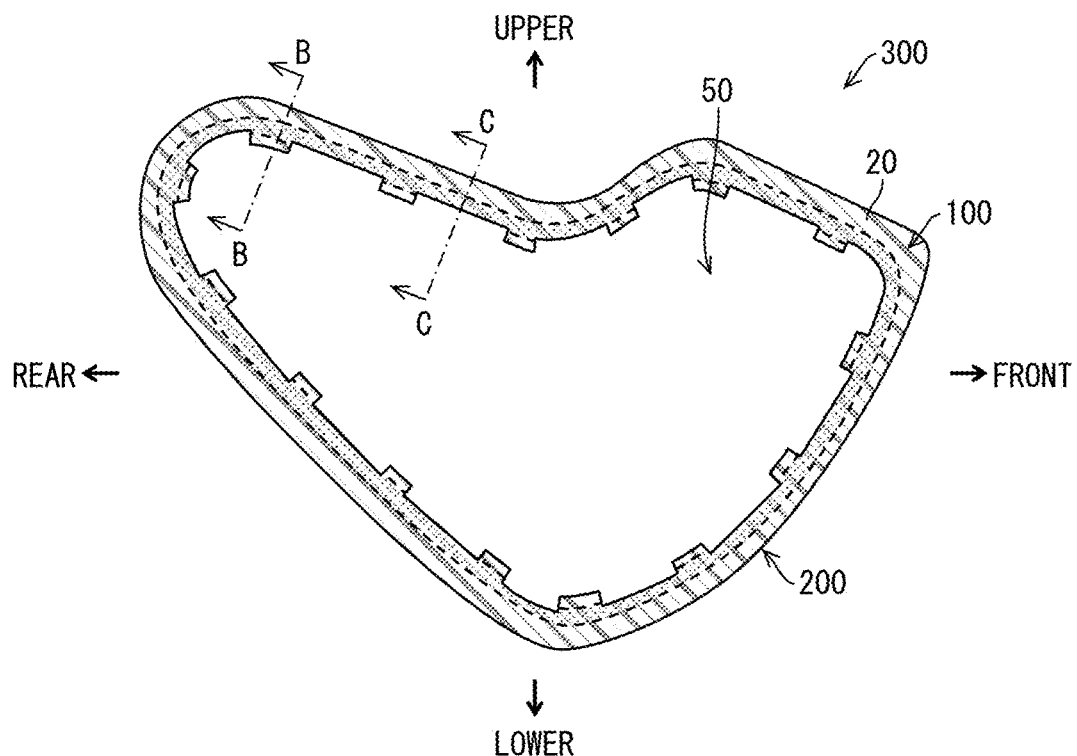
FIG. 3 is a top view of the door hole seal in accordance with Embodiment 1 of the present invention.
Figure 5:
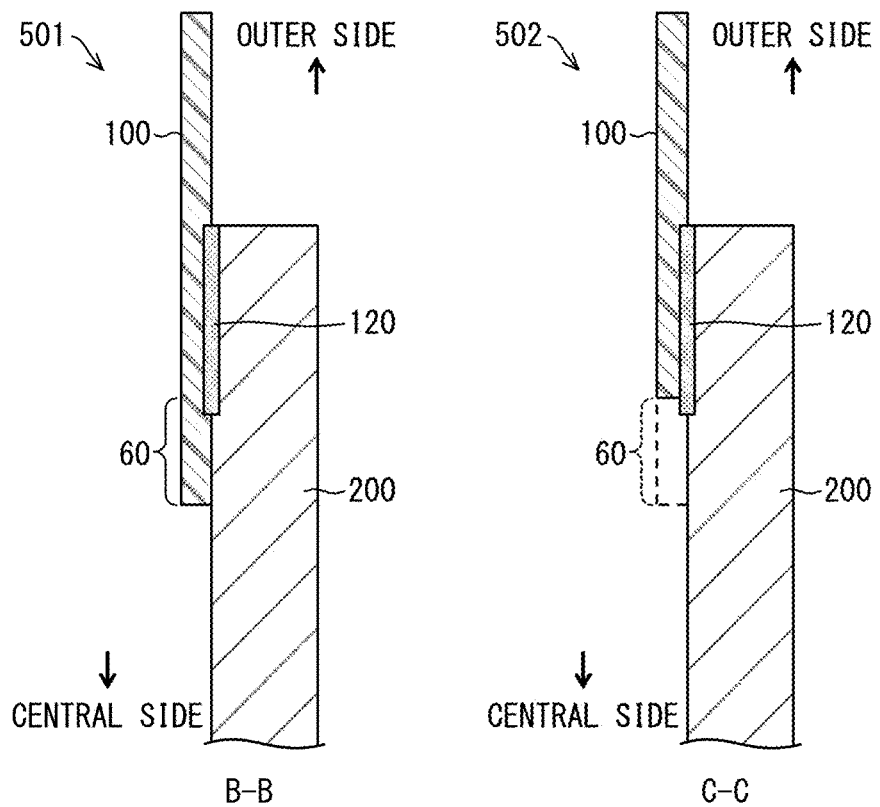

A view indicated by a reference numeral 501 in FIG. 5 is a cross-sectional view taken along a line B-B of FIG. 3, and a view indicated by a reference numeral 502 in FIG. 5 is a cross-sectional view taken along a line C-C of FIG. 3.

FIG. 6 is a top view of a sheet which is to constitute a door hole seal in accordance with Embodiment 2 of the present invention.

A view indicated by a reference numeral "701" in FIG. 7 is a view schematically illustrating a structure of a sheet which is to constitute a conventional door hole seal, a view indicated by a reference numeral "702" in FIG. 7 is a view schematically illustrating a structure of a conventional door hole seal, and views indicated by respective reference numerals 703 and 704 in FIG. 7 are each a cross-sectional view taken along a line A-A of the view indicated by the reference numeral "702".

DESCRIPTION OF EMBODIMENTS

Embodiment 1

The following description will discuss Embodiment 1 of the present invention in detail with reference to FIGS. 1 through 5.

Example of Attachment of Door Hole Seal

Figure 1:
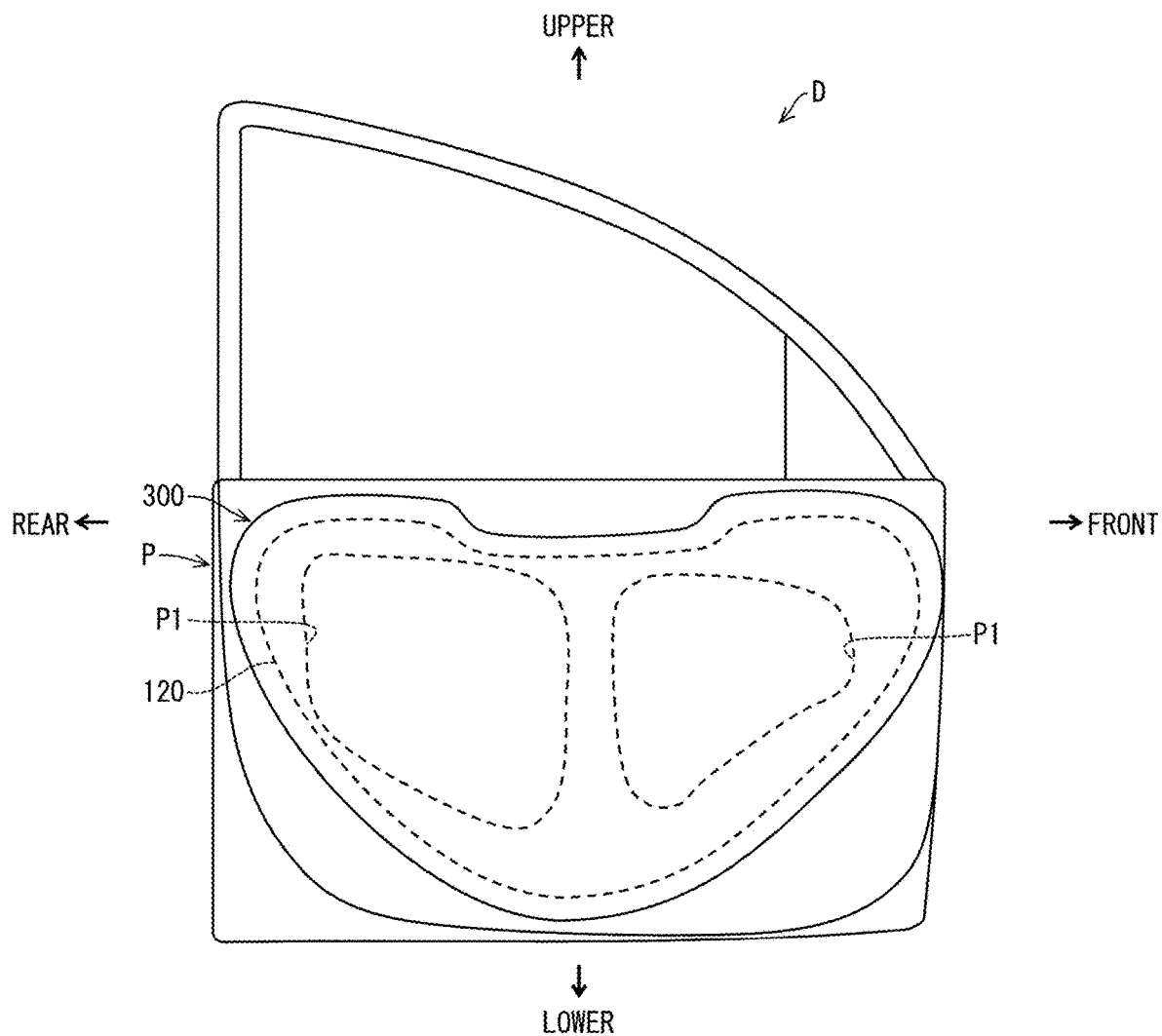
FIG. 1 is a view illustrating a structure of a vehicle-interior side of a front door to which a door hole seal in accordance with Embodiment 1 of the present invention is attached.

First with reference to FIG. 1, the following will discuss a structure of a vehicle-interior side of a front door (a door of a vehicle) D to which a door hole seal 300 in accordance with Embodiment 1 of the present invention is attached. In an example illustrated in FIG. 1, a right-hand side and a left-hand side of a drawing sheet of FIG. 1 respectively correspond to a front side and a rear side of the vehicle.

As illustrated in FIG. 1, the front door D to be provided at an opening for front door (not illustrated) of the vehicle so as to be openable and closable includes a door outer panel (not illustrated) and a door inner panel P. The door inner panel P has a service hole P1 through which attachment and repair of glass and a regulator are carried out.

The door hole seal 300 is attached to the door inner panel P via an adhesive (not shown) such as a butyl sealer. The door hole seal 300 seals the service hole P1 provided in the door inner panel P and the like from the vehicle-interior side to prevent rain or the like, which has entered through a gap between a door glass (not illustrated) and the door outer panel, from further entering an interior of the vehicle through the service hole P1.

Note that the above-described attachment of the door hole seal 300 is merely an example, and the door hole seal 300 may be attached, for example, to a rear door (not illustrated). There is thus no limitation on the type of a door of a vehicle to which the door hole seal in accordance with Embodiment 1 of the present invention is to be attached. Further, a vehicle to which the door hole seal in accordance with Embodiment 1 of the present invention is to be attached is not limited to any particular type and may be a hardtop, a convertible, and the like.

Structure of First Sheet

The following will discuss, with reference to FIGS. 2 through 5, structures of a first sheet (sheet) 100 and the door hole seal 300 in accordance with Embodiment 1 of the present invention. The first sheet 100 is a sheet configured to constitute a part of the door hole seal 300 to be attached to the door inner panel P of the front door D. The first sheet 100 in accordance with Embodiment 1 is made of a resin material having transparency.

Figure 2:
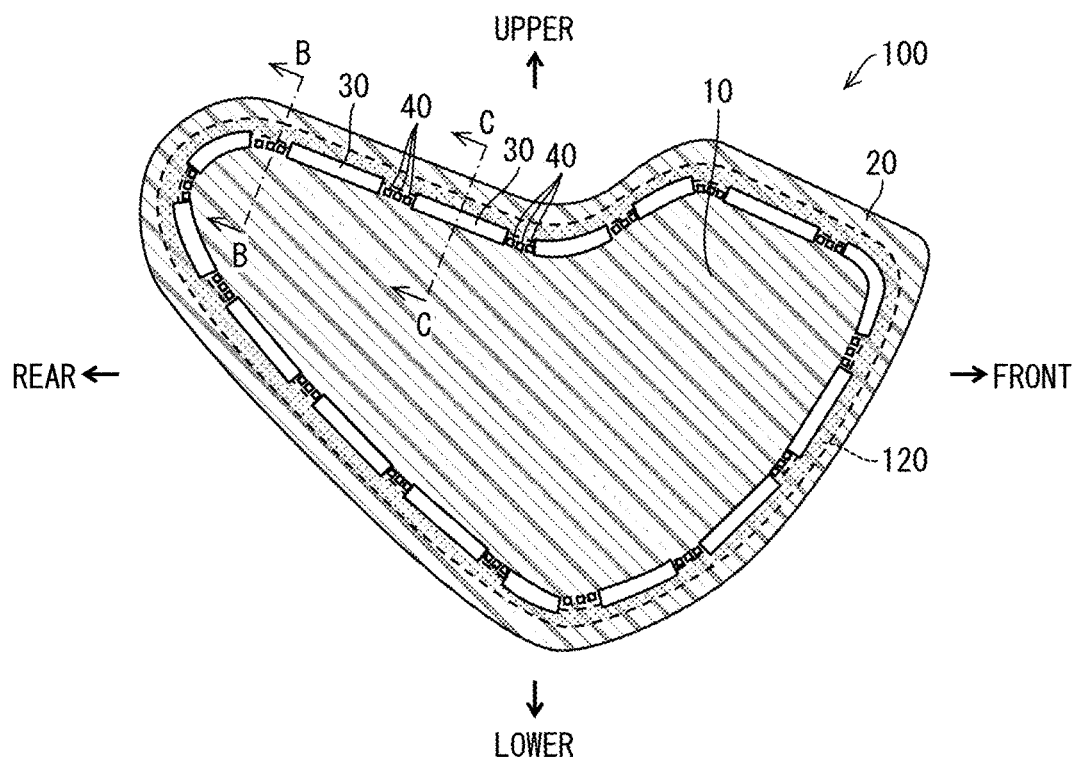
FIG. 2 is a top view of a sheet which is to constitute the door hole seal in accordance with Embodiment 1 of the present invention.

As illustrated in FIG. 2, the first sheet 100 includes a peripheral portion 20 and a central portion 10 surrounded by the peripheral portion 20. The peripheral portion 20 is a portion which is to surround the service hole P1 provided in the door inner panel P. The first sheet 100 has, along a boundary between the central portion 10 and the peripheral portion 20, a plurality of first holes 30 and a plurality of second holes 40 each of which differs in size from each of the plurality of first holes 30. Each of the plurality of first holes 30 is larger than each of the plurality of second holes 40.

The plurality of first holes 30 are each a hole for allowing the central portion 10 to be removed from the first sheet 100. In Embodiment 1, each of the plurality of first holes 30 has a substantially rectangular shape. Note that the plurality of first holes 30 are not limited to the substantially rectangular shape and may be provided in various shapes. The plurality of second holes 40 are each a hole for allowing the central portion 10 and the peripheral portion 20 to be cut off from each other and are, for example, a plurality of small holes arranged along the boundary between the central portion 10 and the peripheral portion 20. In Embodiment 1, more than one second hole 40 is present between each adjacent ones of the plurality of first holes 30. However, the present invention is not limited to this structure provided that, for example, at least one small second hole 40 is present between each adjacent ones of the plurality of first holes 30.

With the above-described structure, in a case where the central portion 10 is removed from the first sheet 100 by cutting the central portion 10 and the peripheral portion 20 off from each other, an unwelded portion 60 (see a view indicated by a reference numeral 501 in FIG. 5) of the first sheet 100 is not present in the vicinities of the plurality of first holes 30. Accordingly, the unwelded portion 60 occupies only a small part of the entire first sheet 100. This enables reducing the generation of an unusual sound resulting from vibration of a part (the unwelded portion 60) of the first sheet 100.

It is preferable that the plurality of first holes 30 and the plurality of second holes 40 be arranged in an alternating manner along the boundary between the central portion 10 and the peripheral portion 20 as illustrated in FIG. 2. This makes it easier to remove the central portion 10 from the first sheet 100 as compared with a case in which a plurality of first holes 30 and a plurality of second holes 40 are not arranged in an alternating manner. In other words, it is preferable that one or more second holes 40 be arranged between each adjacent ones of the plurality of first holes 30 along the boundary between the central portion (10) and the peripheral portion (20) as illustrated in FIG. 2. This makes it easier to remove the central portion 10 from the first sheet 100 as compared with a case in which not all pairs of adjacent first holes 30 are provided with a second hole 40 therebetween.

Structure of Door Hole Seal

The following will discuss the door hole seal 300 in accordance with Embodiment 1 of the present invention with reference to FIG. 3. As described above, the door hole seal 300 is to be attached to the door inner panel P of the front door D. As illustrated in FIG. 3, the door hole seal 300 includes the first sheet 100 and a second sheet (sound insulating material) 200 (see FIG. 5).

The first sheet 100 is a sheet having an opening 50 defined by a line which is to surround the service hole P1 provided in the door inner panel P. The second sheet 200 is a sheet welded to the first sheet 100 and configured to seal the service hole P1 from the vehicle-interior side.

Examples of the material of the second sheet 200 include an elastomer (e.g., a rubber such as ethylene-propylene-diene rubber (EPDM)). Examples of the elastomer also include (i) a resin such as polyethylene (PE), polypropylene (PP), polyvinyl alcohol (PVA), and ABS (Acrylonitrile butadiene styrene) and (ii) a thermoplastic elastomer (TPE). The rubber, the resin, and the thermoplastic elastomer may be foam or fiber, and may be used in the form of a composite of the rubber, the resin, and/or the thermoplastic elastomer or a composite of the rubber, the resin, and/or the thermoplastic elastomer and other material(s).

As illustrated in FIG. 3, an inner circumferential wall of the first sheet 100, which inner circumferential wall defines the opening 50, has an uneven shape made up of a plurality of recesses and protrusions in a plan view. In the vicinity of each recess of the uneven shape, the unwelded portion 60 (see FIG. 5) of the first sheet 100 is not present. Accordingly, the unwelded portion 60 occupies only a small part of the entire first sheet 100. This enables reducing the generation of an unusual sound resulting from vibration of a part (the unwelded portion 60) of the first sheet 100.

Figure 4:
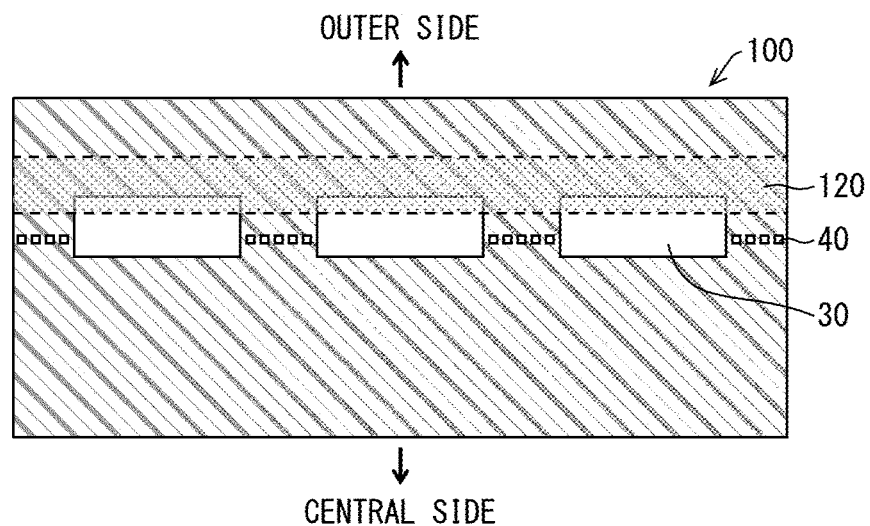
FIG. 4 is enlarged view of a part of a peripheral portion of the sheet.

FIG. 4 is an enlarged view of a part of the peripheral portion 20 of the first sheet 100. As illustrated in FIG. 4, a plurality of first holes 30 are provided along a welding part 120, and a plurality of second holes 40 each of which is significantly smaller than each of the plurality of first holes 30 are provided between each adjacent ones of the plurality of first holes 30. In an example illustrated in FIG. 4, a part of each of the plurality of first holes 30 overlaps with the welding part 120, so that a part of the welding part 120 constitutes a part of a cavity formed by each of the plurality of first holes 30 and the second sheet 200.

From the first sheet 100 having the above-described structure, the central portion 10 is removed by cutting the central portion 10 and the peripheral portion 20 off from each other along the plurality of second holes 40. In this state, the inner circumferential wall of the first sheet 100, which inner circumferential wall defines the opening 50, has an uneven shape made up of a plurality of recesses and protrusions in a plan view (see FIG. 3). Accordingly, the first sheet 100 includes a portion illustrated in a cross-sectional view indicated by a reference numeral 501 in FIG. 5 and a portion illustrated in a cross-sectional view indicated by a reference numeral 502 in FIG. 5. Note that the first sheet 100 and the second sheet 200 are welded to each other via the welding part 120 as illustrated in FIG. 5.

The view indicated by the reference numeral 501 in FIG. 5 is a cross-sectional view taken along a line B-B of FIG. 3. The view indicated by the reference numeral 502 is a cross-sectional view taken along a line C-C of FIG. 3. In the cross section of the view indicated by the reference numeral 501 in FIG. 5, a portion of the first sheet 100 which portion is closer to a center of the door hole seal (i.e., closer to a lower side of a drawing sheet of FIG. 5) than the welding part 120 is the unwelded portion 60. In contrast, in the cross section of the view indicated by the reference numeral 502, the unwelded portion 60 is not present in a portion of the first sheet 100 which portion is closer to the center of the door hole seal than the welding part 120. Accordingly, the unwelded portion 60 occupies only a small part of the entire first sheet 100. This enables reducing the generation of an unusual sound resulting from vibration of a part (the unwelded portion 60) of the first sheet 100.

Method for Producing Door Hole Seal

The door hole seal 300 described above can be produced by, for example, a production method including the following steps (1) through (3).

(1) A step (hole forming step) of forming the plurality of first holes 30 and the plurality of second holes 40 in the first sheet 100 to define the central portion 10 of the first sheet 100 and the peripheral portion 20 of the first sheet 100 as illustrated in FIG. 2.

(2) A step (welding step) of welding, to the first sheet 100 in which the plurality of first holes 30 and the plurality of second holes 40 have been formed, the second sheet 200 such that the second sheet 200 covers the central portion 10 from the vehicle-interior side as illustrated in FIG. 5.

(3) A step (removing step) of removing, from the first sheet 100 to which the second sheet 200 has been welded, the central portion 10 to form the opening 50 as illustrated in FIG. 3.

Embodiment 2

The following description will discuss another embodiment of the present invention with reference to FIG. 6. For convenience of description, members having the same functions as those of the members described in the above-described embodiment are denoted by the same reference numerals, and description thereof will not be repeated.

A first sheet (sheet) 100a is a sheet configured to constitute a part of a door hole seal 300 to be attached to a door inner panel P of a front door D. As illustrated in FIG. 6, the first sheet 100a includes a peripheral portion 20a and a central portion 10a surrounded by the peripheral portion 20a. The peripheral portion 20a is a portion which is to surround a service hole P1 provided in the door inner panel P. The first sheet 100a of Embodiment 2 differs from the first sheet 100 of Embodiment 1 in that the central portion 10a is substantially Y-shaped.

Further, the first sheet 100a has, along a boundary between the central portion 10a and the peripheral portion 20a, a plurality of first holes 30a and a plurality of second holes 40a each of which differs in size from each of the plurality of first holes 30a. The plurality of first holes 30a are each a hole for allowing the central portion 10a to be removed from the first sheet 100a. The plurality of second holes 40a are each a hole for allowing the central portion 10a and the peripheral portion 20a to be cut off from each other and are, for example, a plurality of small holes arranged along the boundary between the central portion 10a and the peripheral portion 20a. In Embodiment 2, each of the plurality of first holes 30a is significantly larger than each of the first holes 30 of the first sheet 100 of Embodiment 1.

The first sheet 100a of Embodiment 2 differs from the first sheet 100 of Embodiment 1 in that the number of the plurality of first holes 30a is significantly small (three) and that each of the plurality of first holes 30a is significantly larger than each of the plurality of second holes 40a. Accordingly, each of the plurality of first holes 30a occupies a large part of the first sheet 100a. Employing this structure enables reducing the number of the plurality of second holes 40a via which the central portion 10a and the peripheral portion 20a are cut off from each other. This makes it easier to remove the central portion 10a from the first sheet 100a.

Aspects of the present invention can also be expressed as follows:

A sheet (first sheet 100, 100a) in accordance with Aspect 1 of the present invention is a sheet configured to constitute a part of a door hole seal (300) to be attached to a door inner panel (P) of a door (front door D) of a vehicle, including: a peripheral portion (20) which is to surround a service hole (P1) of the door inner panel; and a central portion (10) surrounded by the peripheral portion, the sheet having, along a boundary between the central portion and the peripheral portion, a plurality of first holes (30) and a plurality of second holes (40) each of which differs in size from each of the plurality of first holes.

With this configuration, in a case where the central portion is removed from the sheet by cutting the central portion and the peripheral portion off from each other, an unwelded portion of the sheet is not present in the vicinities of the plurality of first holes or the plurality of second holes. Accordingly, the unwelded portion occupies only a small part of the entire sheet. This enables reducing the generation of an unusual sound resulting from vibration of a part (the unwelded portion) of the sheet.

A sheet (first sheet 100, 100a) in accordance with Aspect 2 of the present invention having the above-described configuration of Aspect 1 may be configured such that: the plurality of first holes (30) are each a hole for allowing the central portion (10) to be removed from the sheet; and the plurality of second holes (40) are each a hole for allowing the central portion and the peripheral portion to be cut off from each other. With this configuration, in a case where the central portion is removed from the sheet by cutting the central portion and the peripheral portion off from each other, an unwelded portion of the sheet is not present in the vicinities of the plurality of first holes. Accordingly, the unwelded portion occupies only a small part of the entire sheet. This enables reducing the generation of an unusual sound resulting from vibration of a part (the unwelded portion) of the sheet.

A sheet (first sheet 100, 100a) in accordance with Aspect 3 of the present invention having the above-described configuration of Aspect 1 or 2 is preferably configured such that each of the plurality of first holes is larger than each of the plurality of second holes. With this configuration, in a case where the central portion is removed from the sheet by cutting the central portion and the peripheral portion off from each other, an unwelded portion of the sheet is not present in the vicinities of the plurality of first holes. Accordingly, the unwelded portion occupies only a small part of the entire sheet. This enables reducing the generation of an unusual sound resulting from vibration of a part (the unwelded portion) of the sheet.

A sheet in accordance with Aspect 4 of the present invention is preferably configured such that one or more of the plurality of second holes (40) are arranged between each adjacent ones of the plurality of first holes (30) along the boundary between the central portion (10) and the peripheral portion (20). This configuration makes it easier to remove the central portion from the sheet as compared with a case in which not all adjacent ones of the plurality of first holes are provided with a second hole therebetween.

A door hole seal (300) in accordance with Aspect 5 of the present invention is a door hole seal in accordance with an aspect of the present invention is a door hole seal to be attached to a door inner panel (P) of a door (front door D) of a vehicle, including: a sheet (first sheet 100) having an opening (50) which is to surround a service hole (P1) provided in the door inner panel; and a sound insulating material (second sheet 200) welded to the sheet and configured to seal the service hole from a vehicle-interior side, the sheet having an inner circumferential wall which defines the opening and has an uneven shape made up of a plurality of recesses and protrusions in a plan view.

With this configuration, an inner circumferential wall of the sheet, which inner circumferential wall defines the opening, has an uneven shape made up of a plurality of recesses and protrusions in a plan view. In the vicinity of each recess of the uneven shape, the unwelded portion of the sheet is not present. Accordingly, the unwelded portion occupies only a small part of the entire sheet. This enables reducing the generation of an unusual sound resulting from vibration of a part (the unwelded portion) of the sheet.

A method in accordance with Aspect 6 of the present invention for producing a door hole seal (300) is a method for producing a door hole seal to be attached to a door inner panel (P) of a door (front door D) of a vehicle, the method including: a hole forming step of forming, in a sheet (first sheet 100) configured to constitute a part of the door hole seal, a plurality of first holes (30) and a plurality of second holes (40), each of which differs in size from each of the plurality of first holes, to define (i) a peripheral portion (20) of the sheet which peripheral portion is to surround a service hole (P1) of the door inner panel and (ii) a central portion (10) of the sheet which central portion is surrounded by the peripheral portion; a welding step of welding, to the sheet in which the plurality of first holes and the plurality of second holes have been formed, a sound insulating material (second sheet 200) such that the sound insulating material covers the central portion from a vehicle-interior side; and a removing step of removing the central portion from the sheet to which the sound insulating material has been welded. The method provides an effect similar to that of Aspect 1 described above.

Supplementary Note

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

10: central portion
10a: central portion
20: peripheral portion
20a: peripheral portion
30: first hole
30a: first hole
40: second hole
40a: second hole
50: opening
100: first sheet (sheet)
100a: first sheet (sheet)
120: welding part
200: second sheet (sound insulating material)
300: door hole seal
D: front door (door of vehicle)
P: door inner panel
P1: service hole

The invention claimed is:

1. A door hole seal to be attached to a door inner panel of a door of a vehicle, comprising:
   a sheet having a single opening which is to surround a service hole provided in the door inner panel; and
   a sound insulating material welded to the sheet and configured to seal the service hole from a vehicle-interior side,
   the sheet having an inner circumferential wall which defines the opening and has an uneven shape made up of a plurality of recesses and protrusions in a plan view.

* * * * *